Dec. 24, 1940. C. HOLLERITH 2,226,511
FAIRING ASSEMBLY
Filed May 24, 1939
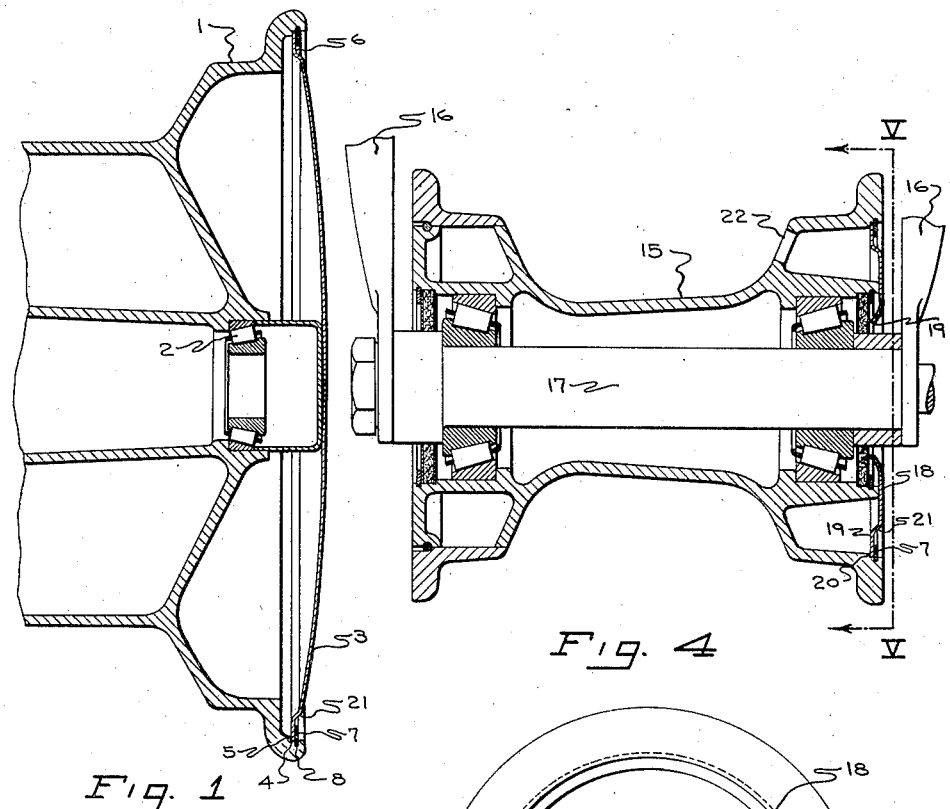
Fig. 1
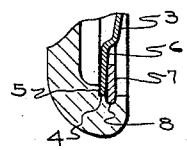
Fig. 2
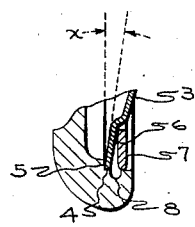
Fig. 3
Fig. 4
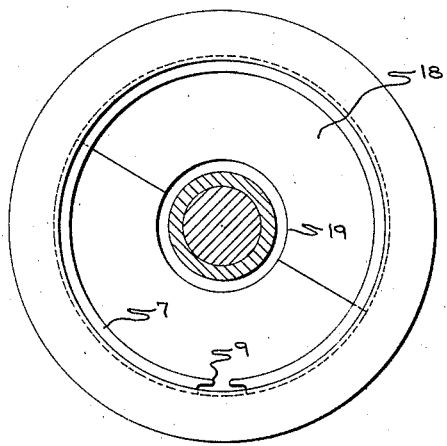
Fig. 5
Inventor
CHARLES HOLLERITH
By Beaman & Langford
Attorneys Patented Dec. 24, 1940

2,226,511

UNITED STATES PATENT OFFICE 2,226,511

FAIRING ASSEMBLY

Charles Hollerith, Jackson, Mich., assignor to Hayes Industries, Inc., Jackson, Mich., a corporation of Michigan Application May 24, 1939, Serial No. 275,353

3 Claims. (Cl. 301—37)

This invention relates to fairings applied to wheels and more particularly to a fairing assembly particularly adaptable to streamlined airplane wheels.

In designing airplane wheels wherein streamlining is an essential feature of their construction in order to reduce air resistance to a minimum, fairings are commonly used. Constructions for securing fairings to airplane wheels must not only be designed with the element of streamlining in mind, but must also be so arranged as to permit speedy removal so that a minimum of time will be required for the servicing of wheels and tires of airplanes, requiring the removal of the fairings, when on landing fields during the course of a regular flying schedule.

The present invention is employable in association with one-piece fairings but is particularly adaptable to two-piece fairings such as are used, for instance, on wheels supported by forks. In general, the invention comprises the use of a spring ring for maintaining the fairing in a recess in the wheel. More specifically the fairing is provided at its outer edge with an annular flange, disposed at an angle to a radially projecting annular shoulder adjacent the periphery of the fairing, and the spring ring is arranged to resiliently urge the flange against the shoulder.

An object of the invention is to provide a wheel fairing supported in position by a spring ring.

Another object of the invention is to provide a wheel fairing having at the outer periphery thereof, a radially extending flange angularly related to a radially extending annular shoulder, associated with structure for urging the flange against the shoulder.

A further object of the invention is to provide a wheel having a split fairing and spring ring structure for holding the fairing in place on the wheel.

These and other objects will be apparent from the following specification when taken with the accompanying drawing, in which Fig. 1 is a vertical section disclosing the invention as applied to the outside of a cantilever supported wheel, Fig. 2 is an enlarged view of a portion of the disclosure of Fig. 1, Fig. 3 is an enlarged detail showing the angular relation of the flange on the periphery of the fairing to the shoulder with which it is associated on the wheel, Fig. 4 is a vertical section disclosing the invention as applied to one side of a wheel supported by a fork, and Fig. 5 is a section of the line V—V of Fig. 4.

Referring particularly to the drawing, the reference character 1 indicates a wheel, of the type arranged for maintaining a pneumatic tire, provided with a bearing 2 for rotatably supporting the wheel on an axle. Covering the outer end of the wheel 1 is a fairing 3 which may be in one piece or of two separate equally sized parts. The fairing 3 is supported in an annular recess 4 as shown more particularly in Fig. 2. The wheel 1 is provided with a shoulder 5 against which a flange 6 adjacent the periphery of the fairing 3 and comprising a part thereof, is urged by a split spring ring 7. The ring 7 is flat and radial in form and is disposed in a recess 8 in the wheel 1, adjacent the recess 4.

As shown in Figs. 1 and 2, the fairing 3 and the securing ring 7 are in their assembled relation. In Fig. 3 is disclosed an enlarged view showing the fairing 3 positioned in the recess 4 of the wheel 1, but with the flange 6 in its unstressed position. It will be observed that the flange 6, when unstressed by the locking spring ring 7, is disposed at an angle to the shoulder 5. This angle indicated by X in the drawing should be from 3 to 5° for best results. When the spring ring 7 is disposed in its recess 8, the spring ring 7 resiliently urges the flange 6 against the shoulder 5, the inherent resiliency of the flange 6 and fairing 3 permitting the flange 6 to move into substantial parallel relation with the shoulder 5. It will then be clear that when in assembled relation, the fairing 3 is always under stress, with the result that not only is the connection between the fairing 3 and the wheel 1 free from rattles, but it is also sufficiently tight to avoid spaces which would interfere with the streamlining efficiency of the construction. The split in the spring ring 7 is shown in the lower portion of Fig. 5 and is of such a nature, preferably, that a screw driver may be employed as a lever to remove the same from the recess 8.

In Figs. 4 and 5 another form of fairing is disclosed. A wheel 15 is supported by a fork 16 through an axle 17. The fairing 18 is provided with a central recess 19 for receiving the axle 17 and is split as shown particularly in Fig. 5, being divided into two equal parts to permit its removal from the wheel notwithstanding the presence of the axle 17 and the forks 16. However, the construction for holding the fairing 18 on the wheel 15 is identical with that disclosed in Figs. 1, 2 and 3, and consists of an annular peripheral flange 19' normally stressed at an angle to a radial annular shoulder 20, and maintained in assembled relation by a split spring ring 7, as shown in Figs. 4 and 5. The fairing 18 as well as the fairing 3 is provided adjacent the flanges 19 and 6 respectively, with an integral outwardly projecting shoulder 21 overhanging the spring ring 7 to increase the streamlining effect of the construction. The wheel 15, as shown, is provided with an opening 22 for receiving the conventional valve stem of the tire. As shown particularly in Fig. 4, a valve stem projecting through the opening 22 is made readily accessible by removing the fairing 18.

While the foregoing specification has described a construction particularly suitable for airplane wheels provided with fairings, it will be understood that my invention is not necessarily limited to airplane wheels, and may be applied in association with any construction having the general characteristics of a fairing where a non-rattling snugly fitting connection is desired.

Having thus described my invention, what I desire by Letters Patent and claim is:

1. In a wheel, a fairing, having an annular flange, said wheel having an annular recess for receiving said flange, said recess having an annular shoulder for laterally supporting said flange, said flange normally being inclined to said shoulder, and a ring anchored to said wheel for stressing said flange against said shoulder.

2. In a wheel, a fairing, having an annular flange adjacent the periphery thereof, said wheel having an annular recess for receiving said fairing, said recess having an annular shoulder for laterally supporting said flange, and a second annular recess adjacent the periphery of said fairing, said flange normally being inclined to said shoulder, and a resilient ring disposed in said second recess for holding said fairing in said recess and for stressing said flange against said shoulder.

3. In a wheel, a fairing, having an annular flange adjacent the periphery thereof, said wheel having an annular recess for receiving said fairing, said recess having an annular radially extending shoulder for laterally supporting said flange, said flange normally being inclined to said shoulder and stressable into substantially parallel engagement said said shoulder, an annular radially extending recess adjacent the periphery of said fairing, and a radially extending split spring ring disposed in said recess and resiliently urging said flange toward said shoulder for holding said fairing in said recess.

CHARLES HOLLERITH.